Figure 1:
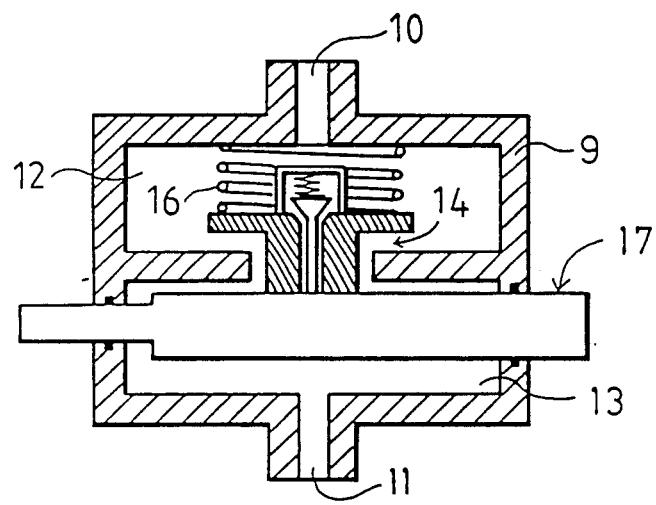

United States Patent [19]
Wondergem

[11] Patent Number: 4,695,101
[45] Date of Patent: Sep. 22, 1987

[54] PRESSURE REGULATOR

[75] Inventor: Anthony L. Wondergem, Waikowhai, New Zealand

[73] Assignee: Development Finance Corporation, Auckland, New Zealand

[21] Appl. No.: 838,597

[22] Filed: Mar. 11, 1986

[30] Foreign Application Priority Data

Mar. 22, 1985 [NZ] New Zealand .................. 211548

[51] Int. Cl.⁴ .............................................. B60T 8/36
[52] U.S. Cl. .................................... 303/117; 303/119
[58] Field of Search .......... 188/181 A; 303/61, 84 R, 303/113, 115, 117, 119

[56] References Cited

U.S. PATENT DOCUMENTS

| 3,466,098 | 9/1969 | Pieren et al. | 303/117 |
| 4,095,851 | 6/1978 | Ando et al. | 303/115 |

FOREIGN PATENT DOCUMENTS

| 2316786 | 10/1974 | Fed. Rep. of Germany | 303/119 |
| 2812390 | 10/1978 | Fed. Rep. of Germany | 303/119 |
| 3133283 | 3/1983 | Fed. Rep. of Germany | |
| 2301418 | 9/1976 | France | |
| 2358299 | 2/1978 | France | |
| 2551007 | 3/1985 | France | |
| 1377916 | 12/1974 | United Kingdom | |

*Primary Examiner*—Duane A. Reger
*Attorney, Agent, or Firm*—Young & Thompson

[57] ABSTRACT

A pressure regulator for an anti-lock braking system has a pressure modulating plunger having different cross-sections along its length to vary the available fluid volume within a chamber situated in a brake line between a master cylinder and a wheel cylinder. The plunger also incorporates a cam portion so that rotation of the plunger causes the cam portion to operate a valve allowing fluid to flow into the chamber. Closing of the valve allows the plunger to move in or out of the chamber to modulate the brake pressure between the regulator and the wheel cylinder to counteract locking of the wheel and consequent skidding.

3 Claims, 7 Drawing Figures

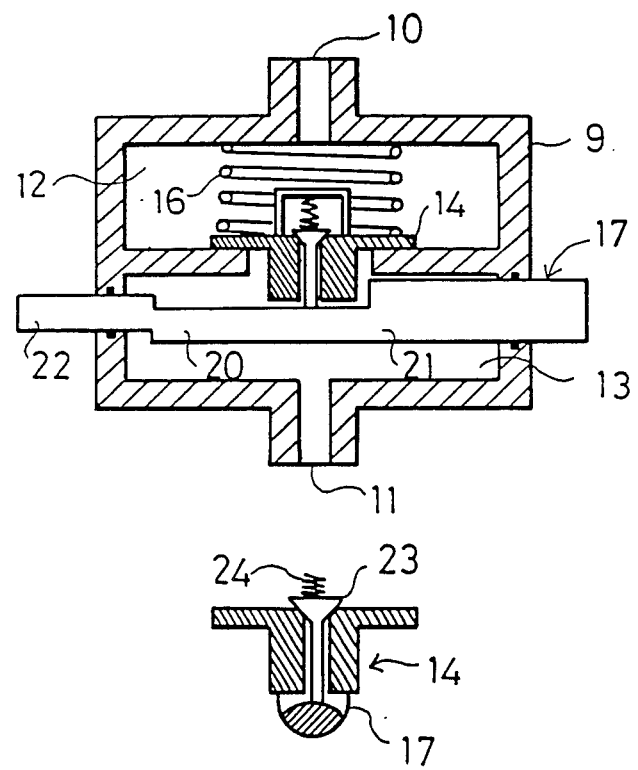

PRESSURE REGULATOR

FIELD

This invention relates to pressure regulator for braking systems, variously known as anti-locking or anti-skid braking systems.

BACKGROUND

In the past, various attempts have been made to provide a regulating mechanism for the hydraulic pressure of a vehicular brake mechanism. The purpose is to decrease the pressure on a hydraulic brake when a sensor detects that the wheel locks up and thus risks skidding on the road surface. Such attempts have generally been made by providing means for pumping fluid away from the operating or slave cylinder of the brake on the locked wheel.

Examples of prior art anti-locking braking systems include:

Lester et al, U.S. Pat. No. 3,544,171;
Skoyles, U.S. Pat. No. 3,724,914;
Gfeller, U.S. Pat. No. 3,752,268;
Baynes et al, U.S. Pat. No. 4,046,427.

Lester et al discloses the use of a servo controlled piston to move a cylinder into or out of a chamber to vary the chamber volume and hence decrease the braking pressure when skidding occurs.

Baynes discloses an inertial cam which is responsive to the skidding of a rear wheel, and requires a complex fly-wheel arrangement to regulate the braking pressure.

Skoyles teaches the use of a rotary cam to actuate a pump thereby increasing braking pressure after the brake pressure has been released.

Gfeller describes a complex system for controlling the braking pressure on a mountain railway.

Such regulators have, however, been expensive to construct and install.

Their complexity and need for servos on pumps increase the size and weight of the entire braking system.

OBJECT

It is an object of the present invention to provide a simple pressure regulating means for hydraulic brake mechanisms, or which will at least provide brake manufacturers with a useful choice.

SUMMARY OF THE INVENTION

In a first aspect the invention provides a pressure regulator for an anti-lock hydraulic braking system, the regulator including:
 a housing with an inlet and an outlet for hydraulic fluid;
 an inlet chamber and an outlet chamber, fluid connection between these chambers being controlled by valve means;
 means for opening or closing the valve means comprising a rotable cam in contact with said valve means;
 and means for modulating the pressure within said outlet chamber when the fluid connection between the inlet and outlet chambers is cut off.

In a second aspect the invention provides an anti-lock hydraulic braking system including:
 at least one pressure regulator as described in the preceding paragraph;
 at least one hydraulic actuating means, each arranged to apply a brake to a moving object;
 at least one sensor, each sensor at or adjacent each moving object;
 a hydraulic pressure generator adapted to supply hydraulic fluid under pressure to said hydraulic actuating means to apply said brakes;
 and at least one of said pressure regulators between said pressure generator and said actuating means to regulate the hydraulic fluid pressure reaching the actuating means in response to signals from said sensor(s).

Preferably, the modulating pressure includes a plunger extending into the outlet chamber so that the volume of the outlet chamber available to the hydraulic fluid can be varied by moving the bulk of the plunger into or out of the chamber.

Preferably the plunger is also rotatable and incorporates the cam so that rotation of the plunger can open or close the valve means.

It is further preferred that the plunger extends through apertures in the housing and the plunger has one region of reduced cross-section and one region of a larger cross-section, so that movement of the plunger in one direction will withdraw a portion of the larger cross-section of the plunger from the outlet chamber whilst allowing a portion of the reduced cross-section of the plunger to enter the outlet chamber whereby the available fluid volume of the outlet chamber is reduced.

Preferably, the valve means comprises two valve members, a first valve member normally open but arranged to be closed by the operating means when the sensor causes the operating means to close the valve, and a second valve member normally closed, but arranged to be opened if the sensor indicates that the wheel, once freed from locking, is rotating more freely, so that further pressure can be transmitted to the wheel.

Preferably the plunger is operated by an electric solenoid receiving an electrical signal from a sensor.

By using the combined cam/plunger with a solenoid to rotate the plunger and to move the plunger axially the pressure regulator can be a compact unit allowing for a simple and relatively light weight anti-lock braking system.

DRAWINGS

The above gives a broad description of the present invention, a preferred form of which will now be described by way of example with reference to the accompanying drawings in which:

FIG. 1 is a cross-sectional view of a pressure regulator in accordance with the present invention.

Figure 2:
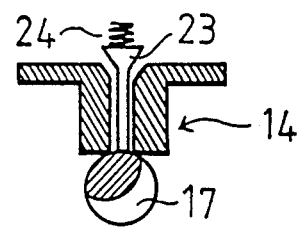

FIG. 2: is a sectional view of part of the mechanism shown in FIG. 1.

FIG. 3: is a view similar to FIG. 1 showing the mechanism in a second configuration.

FIG. 4: is a sectional view of part of the mechanism shown in FIG. 3.

Figure 5:
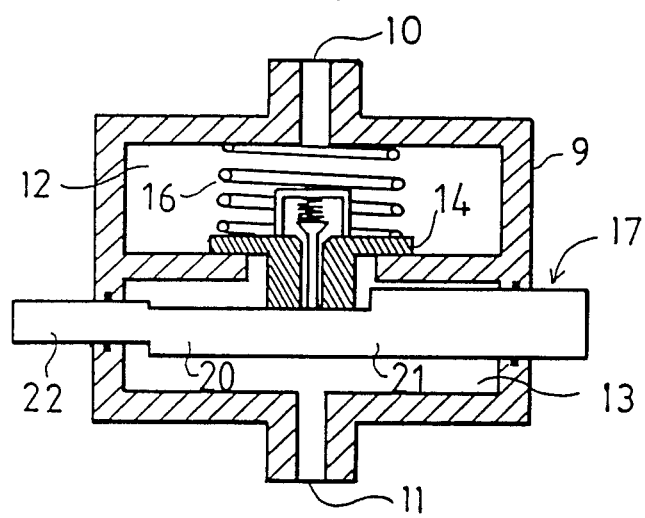

FIG. 5: is the mechanism shown in FIGS. 1 and 3 in a third configuration.

Figure 6:
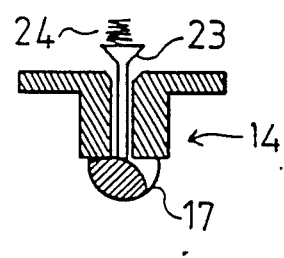

FIG. 6: is a sectional view of part of the mechanism shown in FIG. 5.

Figure 7:
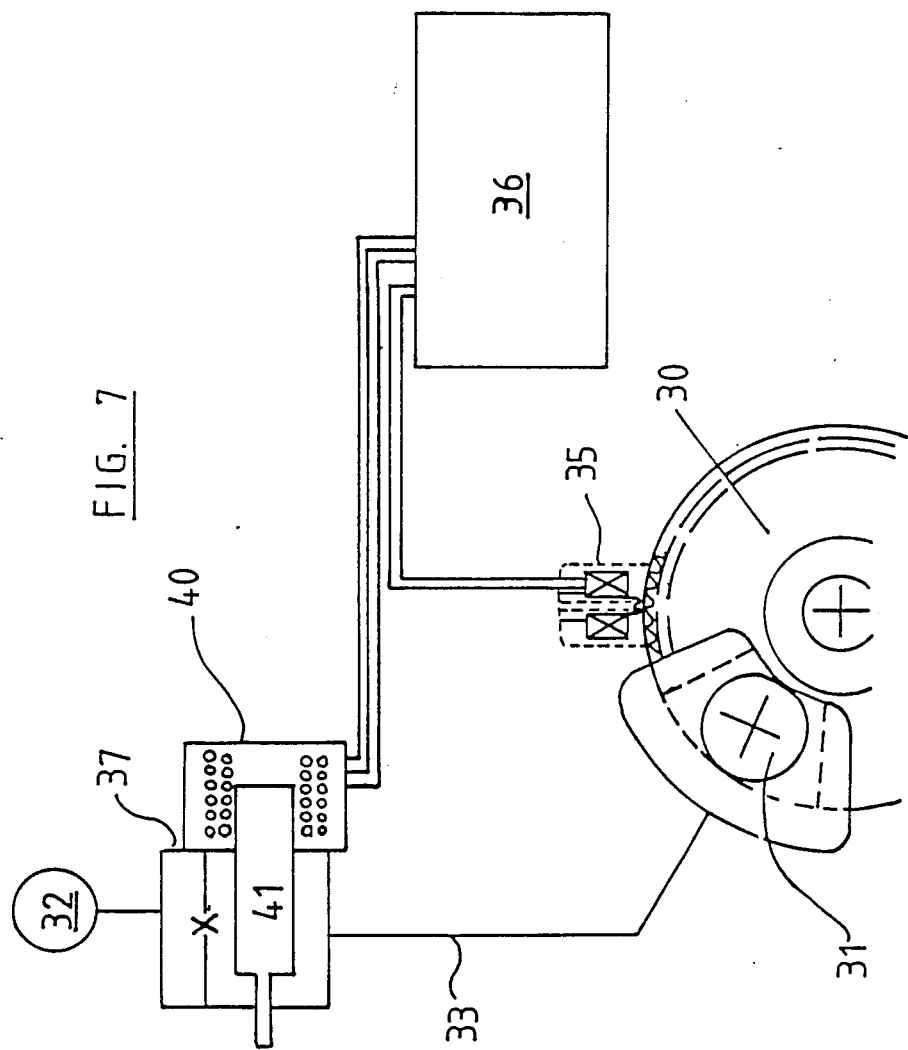

FIG. 7: is a schematic view of an anit-lock braking system applied to the disc brake of one wheel.

PREFERRED EMBODIMENT

The preferred regulator shown in the drawings comprises a housing 9 with a fluid inlet 10 and a fluid outlet 11. Between the inlet and outlet are an inlet chamber 12, an outlet chamber 13 and a valve 14 between them which can open and close communication between the chambers. This valve is urged into the closed position by a spring 16.

Below the valve is a plunger or cam rod 17, the cross-sectional profile of which can be seen in FIGS. 2, 4 and 6. The central portion 20 of the cam rod comprises an oval cam section while the end portions 21, 22 are cylindrical, but of different diameters. The smaller diameter portion at the left of FIG. 1 passes through a sealed aperture in the housing. The larger diameter portion at the right of FIG. 1 also passes through a sealed aperture so that the plunger can move axially with respect to the housing and can also rotate with respect to the housing without allowing fluid to escape passed the seals.

The cam rod is arranged to move in two different modes. In this instance the two modes are rotational and axial movements within the chamber 13. These movements can be effected by any appropriate operating mechanism such as a solenoid or servo-mechanism arrangement, typically controlled by electronic circuitry such as a micro-processor or other electronic control circuit.

Normally, the valve will be held open as shown in FIGS. 1 and 2. However, if a wheel of the vehicle locks up under heavy braking, a sensor at the wheel will detect that it is moving more slowly than the other wheels. This will cause the electronic operating circuit to rotate the cam rod 17 into the position shown in FIG. 4, so that the valve 14 is closed under the urging of the spring 16, as shown in FIG. 3. The valve thereby disrupts communication between the master cylinder (pressure generating mechanism) and the slave cylinder (hydraulic actuating means). No further pressure therefore can be applied to the brake on that wheel, regardless of how much pressure is applied to the rest of the system.

If the system is such that the sensor is able to detect a wheel that is just about to lock, such an arrangement may be sufficient for most circumstances. However, it is more likely that it will now be desirable to reduce the pressure to the brake to allow the wheel to start moving again. This is done by increasing the volume of the fluid downstream of the valve.

In the illustrated embodiment, this is done by moving the cam rod 17 to the right in the arrangement shown in FIG. 3. This means that the volume of the chamber 13 is increased as the wider diameter portion 22 enters it. The increase in volume will, of course, reduce the pressure of the brake fluid within the chamber, and also at the slave cylinder.

Normally, only small movements of the rod 17 will be required to enable the brake pressure at the slave cylinder to be reduced sufficiently to release the brakes. When this happens, the sensor at the wheel will detect the renewed movement of the wheel, and further movement of the rod 17 can then be prevented. If the wheel starts to move a bit too freely, the rod 17 can be moved back again under the control of the control circuitry so that the volume within the chamber 13 is reduced again to increase the pressure. This process can be continued back and forth until the pressure is just sufficient to provide the correct amount of braking of the wheel.

If it is required to apply more pressure than can be achieved by longitudinal movement of the rod, the valve can be opened again effectively to restore the valve to normal operating conditions. However, while pressure is still being applied in the upstream chamber 12, it will be difficult to open the valve 14 against the pressure. Instead, a pilot valve, e.g. a needle valve 23, is provided within the main valve 14 and this can be opened by further rotation of the cam member 17, as shown in FIGS. 5 and 6. The valve 23 is normally urged to the closed position by a biasing means, such as a spring 24, except when pushed open by the cam 17.

If the pressure at the brake is sufficient once again to cause the wheel to lock up, further rotation of the cam member 17 back to the position shown in FIG. 3 will once again cut off the further supply of pressure to the brake cylinder, and the pressure can once again be adjusted by longitudinal movement of the rod 17.

FIG. 7 shows an anti-lock braking system applied to one wheel of a motorcycle having a brake disc 30, a wheel cylinder 31 capable of applying disc brakes, and operated hydraulically from a master cylinder 32 via hydraulic line 33.

The rotation of the disc 30 is monitored by an inductive wheel sensor 35 which sends an electrical signal to an electronic control unit 36 (e.g. a micro-processor capable of controlling more than one wheel cylinder).

The pressure regulator 37 is shown schematically in line 33 and its valve can interrupt the application of brake pressure from the master cylinder 32 to the wheel cylinder 31. A solenoid 40 is controlled by the unit 36 and can be operated to cause a ferrous core plunger 41 to rotate or reciprocate as described with reference to FIGS. 1-6.

Thus, the pressure regulator of the preferred embodiment provides a simple and effective means of regulating or modulating the pressure to the wheel cylinders of a vehicle braking system.

ADVANTAGES

By using the combined cam and plunger to vary the volume of the outlet chamber and to control the opening of the valve means between the inlet and outlet chamber it is possible to provide a compact pressure regulator.

Such a regulator controlled by a electric solenoid in response to electrical signals from a wheel sensor allows an anti-lock braking system to be istalled on small vehicles without the need for pumps or servo-mechanisms to assist with the hydraulic fluid pressure.

Thus an anti-locking braking system can be installed on motorcycles or small cars using only the hydraulic braking pressure generated by the rider or driver (although the regulator can also be used with servo-assisted brakes).

VARIATIONS

Many modifications to the above may be made without departing from the scope of the present invention as broadly defined in the claims.

For example, instead of there being a separate regulating mechanism for each wheel of the vehicle, a single regulator may serve two or more wheels.

Instead of the valve 14 being spring biased to its closed position, it may be biased to its position, it may be biased to its open position, to remain there until a cam or other mechanism pushes it closed. The by-pass valve 23 need not necessarily be mounted within the main valve 14, but could be located elsewhere between the chambers 12 and 13.

The rod 17 which combines the functions of opening and closing the valve and of increasing and decreasing the volume of the chamber 13 could be replaced by two separate members each performing a separate task. In other words, one member would operate the valve, while the other, typically a diaphragm or a piston-and-cylinder arrangement, would control the volume of the chamber.

The present invention may be provided for use in machinery, other than vehicles, where it may be required to apply braking to more than one part of the machine at a time.

Any suitable sensing arrangement for detecting the speed of the wheels may be used, and any suitable operating system or electronic or fluidic control circuitry may be used between the sensing device and the regulator.

I claim:

1. A pressure regulator for an anti-lock hydraulic braking system, the regulator including:

a housing with an inlet chamber and an outlet chamber;

an inlet for hydraulic fluid to the inlet chamber, an outlet for hydraulic fluid from the outlet chamber and a passage for the hydraulic fluid between the inlet chamber and the outlet chamber;

valve means which can be opened and closed to control the flow of hydraulic fluid through the passage between the inlet chamber and the outlet chamber;

and a plunger locatable in the outlet chamber and capable of being moved linearly therein to vary the volume of the outlet chamber occupied by the hydraulic fluid to modulate the pressure within the outlet chamber when the flow of fluid between the inlet chamber and the outlet chamber is cut off, the plunger being also rotatable in the outlet chamber and incorporating a cam in contact with the valve means, the cam being arranged upon rotation of the plunger to open and close the valve means.

2. A pressure regulator as claimed in claim 1, wherein the plunger extends through the outlet chamber and comprises two regions one being of reduced cross-section and the other being of larger cross-section, so that linear movement of the plunger is one direction will cause a portion of the region of larger cross-section from the outlet chamber to be withdrawn from the outlet chamber and a portion of the region of reduced cross-section to enter the outlet chamber thereby to increase the volume of the outlet chamber occupied by the hydraulic fluid.

3. A pressure regulator as claimed in claim 2, wherein the valve means includes a main valve and a pilot valve each of which can be opened by the cam.

* * * * *